United States Patent [19]

van der Wal et al.

[11] Patent Number: 4,590,045
[45] Date of Patent: May 20, 1986

[54] MOVABLE CATALYST BED REACTOR

[75] Inventors: Hans van der Wal; Hendrik J. Scheffer, both of Amsterdam, Netherlands

[73] Assignee: Shell Oil Company, Houston, Tex.

[21] Appl. No.: 702,978

[22] Filed: Feb. 19, 1985

[30] Foreign Application Priority Data

Mar. 8, 1984 [GB] United Kingdom ............... 8406062

[51] Int. Cl.⁴ .................... B01J 8/12; B01J 35/04
[52] U.S. Cl. .................... 422/216; 34/174; 208/165; 208/173; 422/188; 422/197; 422/147; 422/220
[58] Field of Search .............. 208/165, 168, 169, 173, 208/213; 34/165, 174, 57 E; 422/143, 216, 218, 219, 311, 147, 220

[56] References Cited

U.S. PATENT DOCUMENTS

| | | | |
|---|---|---|---|
| 2,518,842 | 8/1950 | Weber | 208/173 |
| 2,530,274 | 11/1950 | Weber | 208/173 |
| 2,534,859 | 12/1950 | Evans | 208/169 |
| 2,685,343 | 8/1954 | Permann | 34/174 X |
| 2,835,051 | 5/1958 | Rydin | 34/174 |
| 2,899,283 | 8/1959 | Hennisan | 208/165 |
| 4,141,690 | 2/1979 | Persico et al. | 208/165 X |
| 4,167,553 | 9/1979 | Persico et al. | 208/165 X |

Primary Examiner—Andrew H. Metz
Assistant Examiner—Glenn A. Caldarola
Attorney, Agent, or Firm—Kimbley L. Muller

[57] ABSTRACT

The present invention relates to a movable catalyst bed reactor provided with catalyst bed supporting and guiding means in the shape of one or more downwardly converging conical surfaces with one or more vertical outlet channels connected to the lower end(s) of the conical surface(s), the supporting and guiding means comprising one or more screen sections for withdrawal of reactor effluent from the catalyst, and separate outlet means for reactor effluent and catalyst, wherein the vessel is further provided with conduit means for forming a protecting layer of substantially spherical particles along the surface(s) of the screen section(s) facing catalyst, which layer is movable along the screen section(s).

4 Claims, 2 Drawing Figures

MOVABLE CATALYST BED REACTOR

FIELD OF THE INVENTION

The present invention relates to a movable catalyst bed reactor for the catalytic treatment of hydrocarbons, and in particular for the catalytic desulfurization and the catalytic demetallization of petroleum residues. The invention further relates to a process in which such a reactor is employed.

BACKGROUND OF THE INVENTION

Movable catalyst bed reactors are well known for the catalytic desulfurization and demetallization of petroleum feedstocks. Such reactors will often comprise a normally vertically extending, substantially cylindrical vessel having separate inlet means for reactant and catalyst at the upper part of the vessel, and containing catalyst bed supporting and guiding means in the shape of one or more downwardly converging conical surfaces, with one or more vertical outlet channels connected to the lower end(s) of the conical surface(s), the supporting and guiding means comprising one or more screen sections for withdrawal of reactor effluent from the catalyst, the vessel being further provided with separate outlet means for reactor effluent and catalyst in a lower part of the vessel. Movable catalyst bed reactors of a design as identified above are described e.g. in British Pat. Nos. 8,024,870 and 8,120,176, and in U.S. Pat. No. 3,883,312.

In movable catalyst bed reactors normally catalyst particles are employed having diameters in the range of between about 0.1 and 10 mm, and in particular 1–3 mm. Preferably the catalyst particles are of spherical shape, but cylindrical particles, e.g. extrudates, may be used too.

The use of movable catalyst bed reactors appears to be quite satisfactory from a chemical point of view, but from a mechanical point of view some improvements could still be made to reduce the risk of malfunctioning. One of the problems frequently encountered is plugging of the separating screens (which should retain the catalyst particles while letting the fluid reaction products pass through) by chips and fines. Also, some fouling and erosion of the fluid conduits, pumps and valves forming part of the reactor effluent withdrawal system of movable catalyst bed reactors have been experienced.

An investigation into these problems has revealed that in movable catalyst bed reactors high solid stresses may occur, depending on reactor geometry and pressure drop, thereby causing breakage of the catalyst particles and formation of irregularly shaped chips and fines. It appears in particular, that some particles, which at first sight seem to be spherical actually contain concealed cavities, which render them likely to collapse under pressure. The smallest chips and fines can pass through the separating screens and flow with the reactor effluent to various conduits, pumps etc. which is highly undesired. The larger chips do not pass through the separating screens, but they unfortunately get stuck in the screens' openings, thereby obstructing the passage of reactor effluent. It will be clear that spherical and almost spherical particles are less likely to plug the reactor separating screens since they are able to roll over the separating screens, provided their size exceeds that of the screens' openings.

One solution for reducing the problem of screen plugging is described in Applicant's copending British patent application No. 8133526. According to this publication the catalyst particles are carefully picked out before supplying them to a movable catalyst bed reactor, in order to provide an easily flowing catalyst mass possessing a high intrinsic crushing strength. This solution is independent from the reactor geometry and the operating conditions in the reactor itself. It has now been found that the risk of plugging of the screens' openings in a movable catalyst bed reactor can be further reduced and even substantially eliminated by properly shielding the separating screens against the inflow of irregularly shaped catalyst particles.

SUMMARY OF THE INVENTION

The invention therefore relates to a movable catalyst bed reactor which comprises a normally vertically extending substantially cylindrical vessel having separate inlet means for reactant and catalyst at the upper part of the vessel, and containing catalyst bed supporting and guiding means in the shape of one or more downwardly converging conical surfaces with one or more vertical outlet channels connected to the lower end(s) of the conical surface(s), the supporting and guiding means comprising one or more screen sections for withdrawal of reactor effluent from the catalyst, and separate outlet means for reactor effluent and catalyst, wherein the vessel is further provided with relatively narrow conduit means for forming a protecting layer of substantially spherical particles along the surface of each screen section facing catalyst, which layer is movable along the screen section.

The invention further relates to a process for catalytic treatment of hydrocarbons, in which process a reactor according to the invention is employed, said process comprises according to the invention the formation of a downwardly movable layer consisting of substantially spherical particles along the surface(s) of the screen section(s) facing catalyst, thereby protecting the screen section(s) against plugging by irregularly shaped particles.

DETAILED DESCRIPTION OF THE INVENTION

During operation of the above reactor according to the invention fines and chips in the catalyst bed cannot reach the screen sections owing to the presence of a layer of spherical particles in front of the screens, which layer forms a barrier against the passage of fines and chips. This protecting layer may theoretically consist of a single row of spherical particles. It is however advisable to choose for a protecting layer having a thickness which equals the thickness of a plurality of rows of spherical particles. The thickness of the protecting layer should preferably be further chosen in correlation with the length of the relevant screen section, in that a greater length of the screen section should be accompanied with a greater thickness of the protecting layer.

The last-mentioned preference as to the thickness of the protecting layer may be explained in the following way. When catalyst particles are to be withdrawn from the bottom part of a movable catalyst bed reactor for renewal, a catalyst outlet valve is opened causing an increase of the porosity of the catalyst bed thereby enabling relative motion between the catalyst particles and gravity flow of the catalyst particles and particles of the protecting layer commences. Apart from the driving force exerted by the gravity on the catalyst particles and tending to move the particles in downward direction, the particles are also subjected to the forces of the fluid passing through the catalyst bed. The fluid flowing towards the separating sections tend to push the catalyst particles against these sections. Unlike the broken catalyst particles, the spherical particles can quite easily roll over the separating sections, and do not form a serious plugging problem for these sections. By arranging a protecting layer merely or substantially merely consisting of spherical particles in front of the screen sections the broken particles in the catalyst bed cannot reach the separating sections. The broken particles in the outer layer of the catalyst bed are in fact absorbed in the protecting layer and are withdrawn from the screen together with the protecting layer by gravity flow. The particles forming the protecting layer during operation of the reactor according to the invention should have a size exceeding the size of the openings in the separating sections. It is further preferred to apply particles having a size not exceeding the average size of the particles in the catalyst bed in order to get a stable fluid flow and to avoid preferred flow passages for the broken catalyst particles towards the separating sections.

The particles forming the protecting layer may consist of catalyst material or of an inert material such as glass. If the protecting layer is formed of catalyst material having a slight tendency for breaking, care should be taken that such catalyst particles are not broken during their transport to the reactor, their presence in and their motion through the reactor.

The stresses in a movable catalyst bed supported by conical catalyst bed supporting means in a movable catalyst bed reactor are determined not only by the diameter of the catalyst bed but also by the geometry of the catalyst bed retaining and supporting means. Increase of the diameter of the reactor, and therefore of the catalyst bed causes a proportional increase of the stresses on the catalyst particles. The influence of the geometry of the catalyst bed retaining and supporting means on the stresses in the catalyst bed will now be discussed.

In a movable catalyst bed reactor with conical catalyst bed supporting means, a large discontinuity of the stresses on the catalyst material occurs at the transition from the cylindrical vessel wall to the converging conical supporting surfaces. This is a consequence of the fact that two different wall conditions are possible corresponding to different stress states. The difference of both stress states can be illustrated by considering a fill retained by a wall. The actual stress exerted on the wall by the fill is much smaller than the reactive stress with which the fill would resist a horizontal motion of the wall. The first is called the active wall stress, the second the passive wall stress. In a cylindrical section of the reactor the catalyst material is in the active stress state, in converging sections it is—under flow condition—in the passive stress state. In the passive state the stress coefficient, i.e. the ratio of the horizontal stress and the vertical stress on the catalyst particles is much larger than in the active state. On the other hand the vertical stress,—caused by the compressive forces of the catalyst particles acting upon one another, the particles own weight and the pressure gradient caused by the fluid flow through the catalyst bed—may be assumed to vary over the transition between the cylindrical vessel wall and a converging conical catalyst bed supporting surface. Therefore, a considerable increase in the normal stress induced on the boundary wall at the transition by the catalyst particles occurs. This wall stress will be balanced by the shear stress on the catalyst particles at the boundary wall.

From the above it will be clear that in order to prevent breakage of the particles forming the protecting layer for a separating section, these particles should not be subjected to the relatively high stresses occurring in the catalyst bed itself, in particular at a sharp transition from a parallel section to a converging section. It will therefore be understood that a separate passage should preferably be provided in the catalyst bed at least at the transition to the conical supporting surface for the particles forming the protecting layer, in particular if the protecting layer is formed by catalyst particles. From a point of view of breakage risk the arrangement of a separate passage at the transition to the conical surface is not necessarily of major importance if the protecting layer is formed by particles of a different constituency than that of the catalyst material. In the latter case these particles should have a breakage strength sufficient to withstand the peak stresses occurring at the upper ends of the conical catalyst supporting surfaces. If the protecting layer is formed by non-catalyst particles, the reactor should however be provided with separate conduit means for such particles in order to prevent premature intermixing with catalyst material.

If the protecting layer is to be formed by spherical catalyst particles the passage should be provided with an open upper end enabling the inflow of catalyst material from the main catalyst bed. If non-catalytic material, such as glass, is used for forming the spherical particles constituting the protecting layer, the vessel should be further provided with separate supply means for supplying spherical particles into the vessel and subsequently to said passage.

The screen section for the removal of reactor effluent from catalyst material in a catalyst bed is preferably arranged in the wall of the vertical outlet channel, in order to reduce the load on the screen section and is furthermore preferably ringshaped. For supplying the protecting layer of spherical particles in front of such an annular screen section the passage for the spherical particles comprises a substantially cylindrical ring-shaped upper part and a substantially conical ring-shaped lower part.

If the screen section is arranged in the wall of the vertical outlet channel for a catalyst bed, the passage has its lower end preferably positioned at or below the lower end of the accompanying conical surfaces, to prevent disturbance of the protecting layer by catalyst material at the transition of the conical surface to the vertical outlet channel.

BRIEF DESCRIPTION OF THE DRAWING

The invention will now be described by way of example only in more detail with reference to the accompanying drawings, wherein FIG. 1 schematically shows a vertical cross section of a movable catalyst bed reactor with screen protecting means according to the invention, and FIG. 2 schematically shows a vertical section of a further reactor according to the invention.

DETAILED DESCRIPTION OF THE DRAWING

Figure 1:
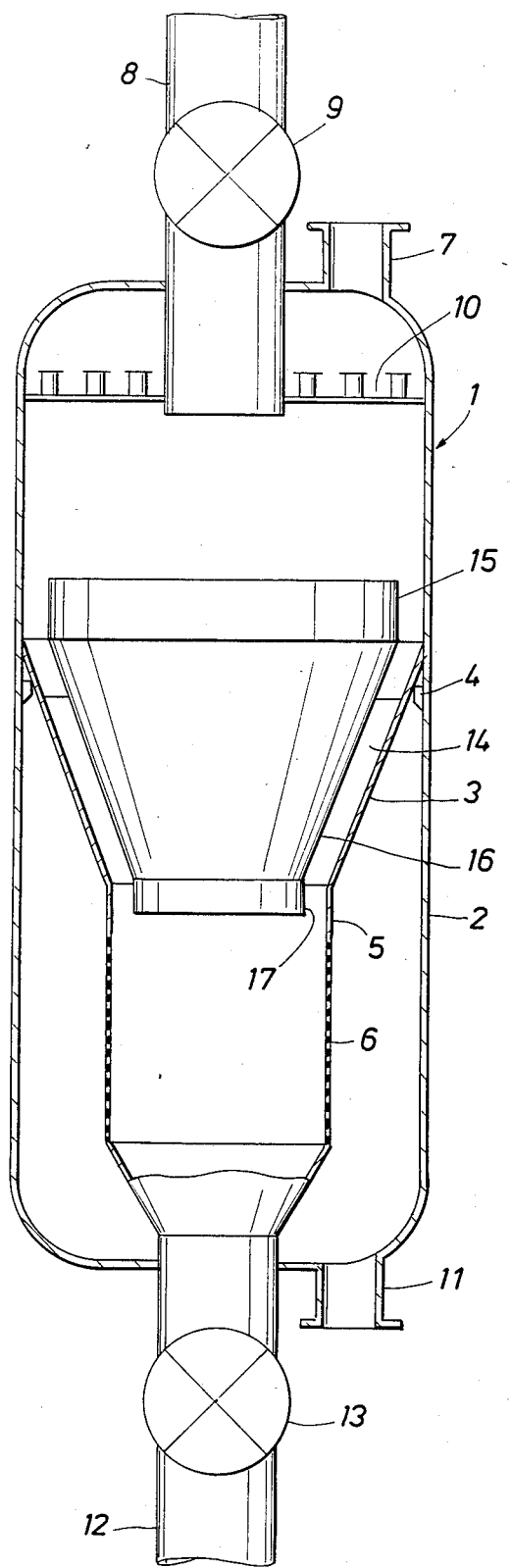

Similar parts in the embodiments of the invention shown in the figures have been identified by the same reference numerals, while no reference numerals have been used for those parts not requiring further elucidation for a good understanding of the invention.

Referring to FIG. 1, a vessel 1 for catalytic treatment of fluids is shown, having a substantially cylindrical sidewall designated by 2. The lower part of the vessel 1 is provided with a downwardly converging conical surface 3 for supporting catalyst material. The conical surface 3 is carried by cone supports 4 mounted on the inner surface of the vessel sidewall 2. The acute angle formed by a line lying in the conical surface and the vertical preferably is in the range of 15°–45°, to ensure a sufficient support for catalyst material and enabling an easy downflow of catalyst during (un)loading operations. The lower end of the conical surface 3 is connected to a substantially vertical and substantially cylindrical outlet channel 5, provided with a substantially cylindrical separating section formed by a screen 6. This screen 6 is permeable to fluid and impermeable to catalyst material to permit fluid to flow from the catalyst bed into a fluid-collecting space between the lower surface of a support surface 3 and the bottom of vessel 1. The screen 6 may suitably be formed by vertically spaced horizontal bars mounted on vertical reinforcing bars. The screen may also be formed by horizontally spaced vertical bars supported by horizontal reinforcing bars. The width of the slit shaped openings between adjacent horizontal bars is so chosen that unbroken catalyst material cannot pass through said screen 6. The vessel 1 is further provided with an inlet 7 for fluid and an inlet 8 with a rotary valve 9 for the supply of catalyst particles. For distributing fluid uniformly over the interior of the vessel 1 a distributor tray 10 is arranged above the conical surface 3. Reactor effluent can be discharged from the vessel 1 via an outlet 11 downstream of the screen 6, while catalyst material can be withdrawn via a centrally arranged outlet 12 provided with a rotary valve 13.

According to the invention the vessel's interior is further provided with conduit means forming a passage 14 for supplying a protecting layer of spherical particles at the inner side of the screen 6. In the embodiment of the invention shown in FIG. 1, catalyst material itself will be used for forming a protecting layer during operation. Thereto the passage 14 is formed by the subsequent arrangement of a cylindrical wall 15 substantially concentric with the vessel sidewall 2 and having its upper end arranged below the catalyst bed after filling of the reactor, a downwardly converging conical surface 16 and a lower cylindrical wall 17, having its lower end positioned above screen 6. The cylindrical wall 15, conical surface 16 and lower wall 17 are so positioned relative to sidewall 2, surface 3 and channel 5 respectively that the distance between the opposite walls forming passage 14 is preferably substantially constant over the full length of said passage in order to keep the shear stresses at a minimum level. During filling of the vessel with spherical catalyst material, a catalyst bed is formed on top of the conical surface 3 while simultaneously passage 14 is also filled with spherical catalyst particles. After filling, fluid to be catalytically treated is introduced via fluid inlet 7 and is distributed over the catalyst bed by passing through the openings in the distributor tray 10. The fluid passes subsequently downwards through the bed and leaves the bed via the openings in the screen 6. If the rotary valve 13 in the catalyst outlet 12 is kept in a closed state, the catalyst particles in the vessel 1 are in rest. In this situation catalyst fines, if any are present, are caught in the voids between the catalyst spheres and will therefore not form any serious risk for blockage of the screen 6. After a certain time of operation the catalyst material is deactivated to such an extent that renewal of the material is required. Thereto the rotary valve 13 in the catalyst outlet 12 is opened causing a downward flow of catalyst material in the space enclosed by the catalyst supporting surface 3 as well as through the passage 14. The catalyst particles passing through said passage 14 are not subjected to the high peak stresses occurring in the main part of the catalyst bed during downward flow of catalyst into the space enclosed by conical surface 3. Since the passage 14 is relatively narrow compared to the vessel diameter, the active stresses on the particles in said passage are relatively low. Changes from the active to the passive stress state will therefore be accompanied by only relatively low peak stresses. The spherical catalyst particles passing through passage 14 will therefore reach the screen 6 substantially without breaking and will form a movable protecting layer of substantially spherical particles in front of said screen. The catalyst material passing through the vertical outlet channel 5 is subjected to a fluid flow-induced force in the direction of screen 6. As a consequence of this force preferentially the broken catalyst particles, which form the risk of screen blockage tend to pass via the pores between the catalyst spheres towards the screen. Due to the presence of the protecting layer in front of the screen, fines should first penetrate through this layer prior to reaching the screen. Since due to the velocity profile in the outlet channel, the porosity of the protecting layer is substantially lower than the porosity of the remaining bed in said channel, the fines shall be hampered in their lateral motion by the protecting layer. Since the protecting layer issuing from passage 14 is substantially free from broken particles and since it takes time to have the fines from the central part of the catalyst penetrated through said protecting layer towards screen 6, the screen will not be attacked by fines provided that the protecting layer is sufficiently thick. The thickness of the protecting layer which should be chosen to prevent contact of the screen by broken particles depends on the porosity of the catalyst bed, the height of the screen 6 and the quantity of broken particles in the bed which might cause blockage of the screen.

Figure 2:
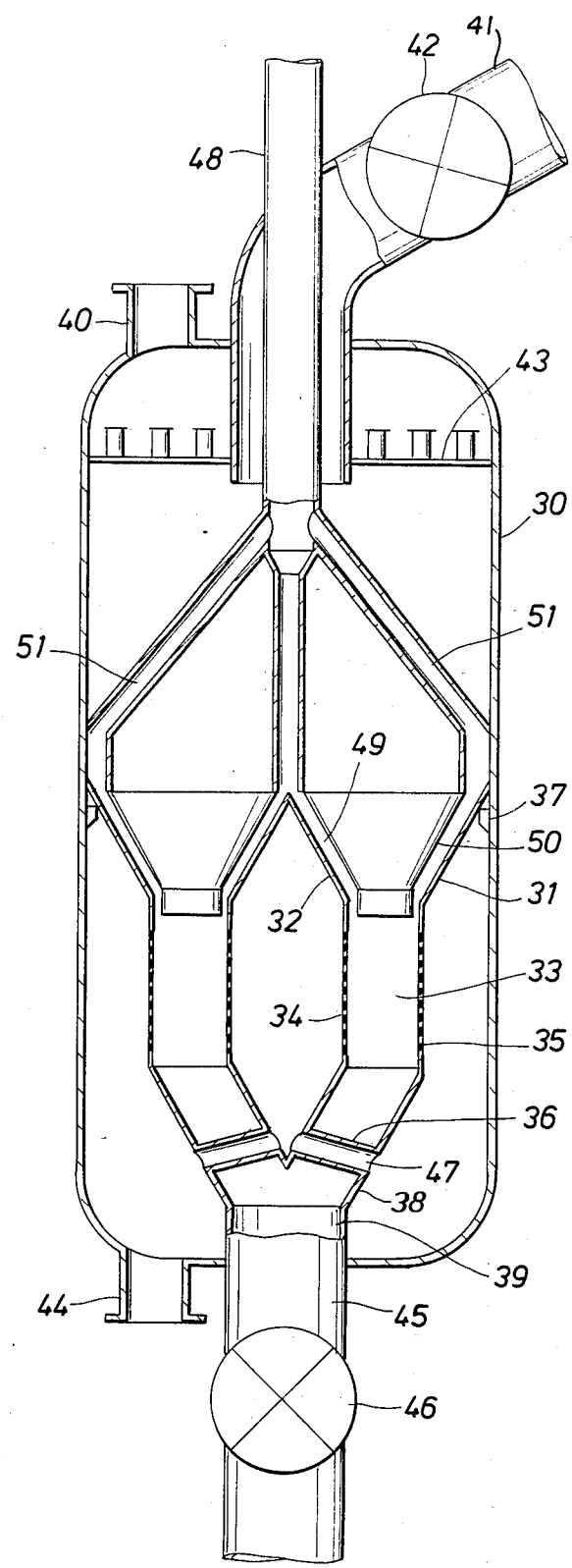

Reference is now made to FIG. 2, showing an alternative of the movable catalyst bed reactor depicted in FIG. 1.

The construction of the reactor shown in FIG. 2 is such that it can suitably be used for carrying out catalytic treatment processes on a larger scale than possible with the first shown reactor. The reactor, indicated with reference numeral 30, is thereto provided with two catalyst bed supporting surfaces, viz. an outer downwardly converging conical surface 31 and substantially concentric therewith an inner downwardly diverging conical catalyst bed supporting surface 32. The outer conical surface 31 and the inner conical surface 32 terminate at their lower end in a ring shaped vertical outlet channel 33 for the passage of catalyst material and reactor effluent. The channel 33 is provided with an inner screen 34 and an outer screen 35 for separating the reactor effluent, which passes through the channel, from the catalyst particles. The inner conical surface 32 and inner screen 34 are carried and supported by insert supports 36 and the outer conical surface 31 by cone supports 37.

The bottom part of the reactor 30 is provided with a lower cone segment 38 forming a passage for catalyst material between the ring shaped channel 33 and a catalyst withdrawal pipe 39. The reactor is further provided with an inlet 40 for fluid to be catalytically treated and an inlet 41 with a rotary valve 42 for catalyst material. Fluid introduced via inlet 40 is distributed over the cross section of the reactor 30 via a distributor tray 43. Reactor effluent and catalyst material are separately dischargable via an outlet 44 and an outlet 45 with rotary valve 46, respectively. Reactor effluent leaving the catalyst bed via inner screen 34 is guided towards the main reactor effluent outlet 43 via a number of fluid passages 47 in the lower part of the catalyst passageway. The reactor shown in FIG. 2 is further provided with a system for arranging during operation protecting layers of spherical particles in front of the screens 34 and 35. This system consists of a substantially central inlet conduit 48, substantially concentric with the catalyst inlet 41. The lower part of said conduit 48 is substantially conically shaped to provide an annular channel between the wall of said conduit and the conical catalyst bed supporting surface 32. To ensure the formation of a proper protecting layer of spherical particles in front of the inner screen 34, the lower end of conduit 48 is preferably at or below the lower end of supporting surface 32. For supplying a protecting layer of spherical particles in front of the outer screen 35 a substantially annular passage having a closed upper end is provided between the reactor sidewall and a cylindrical wall 49 and between the outer conical catalyst bed supporting surface 31 and a conical wall 50. For the same reason as mentioned above with respect to conduit 48 the lower end of wall 50 is preferably positioned at or below the level of the lower end of supporting surface 31. For supplying particles towards the passage defined by the cylindrical wall 49 and the conical wall 50 a plurality of radially extending conduits 51 are arranged between conduit 48 and the said passage.

The operation of the reactor shown in FIG. 2 is as follows. Simultaneously with the loading of the reactor with catalyst material via the catalyst inlet 41, spherical particles are introduced into the reactor via the conduit 48 to encompass the catalyst material in the channel 33 by an inner layer of spherical particles adjacent to inner screen 34 and an outer layer of spherical particles adjacent to the outer screen 35. The spherical particles for forming the protecting layers in front of the screens 34 and 35 may consist of any suitable material having a high breaking strength and being not adversely reactive with the fluid in the reactor. Suitable materials are for example ceramics and inert metals. The spherical particles may also be made of the carrier material of the catalyst particles in the reactor. It should further be noted that the spherical particles may also be formed of catalyst material, separately supplied to the reactor via conduit 48. In this case the difference with the system described with reference to FIG. 1 consists herein that in the first system particles for the protecting layer are separated from the main catalyst bed. While in the second system the catalyst particles for forming the protecting layer are introduced into the reactor separate from the bulk of catalyst material. The second system is particularly advantageous if the main supply system for catalyst may give rise to a substantial breakage of the catalyst particles.

If contamination and deactivation of the catalyst material necessitates replacement, rotary valve 46 in catalyst outlet 45 and rotary valve 42 in catalyst inlet 41 are opened resulting in gravity flow of the catalyst material through the reactor. Simultaneously fresh spherical particles are supplied via conduit 48 to maintain the protecting layers in front of the screen in a proper condition during downflow of the main catalyst bed. The protecting layers forming a barrier for the broken particles in the catalyst bed are consequently continuously refreshed during the catalyst loading, so that plugging of these layers themselves is obviated. The catalyst particles and the spherical particles of the protecting layers are withdrawn from the reactor via the catalyst outlet 45. If the spherical particles have a composition different from that of the catalyst material, steps should be taken to separate these spherical particles from the spent catalyst material prior to reactivation of the latter.

It will be understood that the invention is not restricted to the embodiments described above by way of example. In this connection it should be noted that also combinations of the design features of the embodiments shown in the Figures may be used. The separate supply system for the protecting layers shown in FIG. 2, may for example be used for the reactor configuration shown in FIG. 1. It is further noted that the present invention is not restricted to application of a protecting layer supply system in a single stage catalyst bed reactor as shown in the Figures. If a reactor is of the two or more stage type with a plurality of vertically spaced apart catalyst beds each with its own outlet system, each catalyst bed should be provided with separate means for forming a protecting layer in its outlet system.

What is claimed is:

1. An apparatus comprising an intermittently movable catalyst bed reactor to prepare hydrocarbons therein from a hydrocarbon reactant in the presence of catalyst particles wherein a hydrocarbon reaction product is formed within said reactor and said product and said catalyst particles are separated by a screening means within said reactor to form a catalyst particles withdrawal stream and a hydrocarbon product stream, which apparatus prevents passage of catalyst fines or broken particles of catalyst to pass in accompaniment with said hydrocarbon product stream and which apparatus comprises:

(a) a normally vertical extending substantially cylindrical reactor vessel having an upper part, a lower part, interior side walls and exterior side walls wherein said catalyst particles and said hydrocarbon reaction product pass into, through and out of said reactor vessel;

(b) a separate catalyst inlet means in the upper part of said cylindrical reactor vessel for admission of catalyst particles to said reactor vessel;

(c) a separate hydrocarbon reactant inlet means in the upper part of said cylindrical reactor vessel for admission of hydrocarbon reactant to said reactor vessel;

(d) a separate catalyst discharge means having variable catalyst flow control means in the lower part of said cylindrical vessel for withdrawal of nearly the entire quantity of catalyst particles added through said separate catalyst inlet means;

(e) a separate reaction product discharge means in the lower part of said cylindrical vessel for withdrawal of said hydrocarbon reaction product;

(f) a catalyst bed support means in communication with said interior side walls of said cylindrical vessel and comprising a cylindrical wall, a first conical surface and a lower wall for passing downwardly both hydrocarbon reactant and catalyst particles;

(g) a second conical surface positioned in an acute angle in the range of 15°–45° with respect to said interior and exterior vertical side walls of said reactor vessel and being positioned parallel to said conical surface of element (f) to form a substantially constant distance between said first and said second conical surface over the full length of passage to permit passage of integral solid particles in an unbroken state as a result of the minimum shear stress placed thereon;

(h) a second conical surface support means communicating with said second conical surface and interior side walls of said reactor vessel;

(i) a screen means communicating with said catalyst bed and situated below said first and second evenly spaced conical surfaces with apertures therein for prevention of passage of said catalyst particles and for passage therethrough of said hydrocarbon reaction product and wherein said integral solid particles pass through said constant distance between said first conical surface and said second conical surface to form a protecting layer of integral solid particles immediately juxtaposed to said screen means aperatures and thereby act to shield said screen means against the flow of irregularly shaped or broken catalyst particles through said aperatures of said screen means; and (j) a fluid collection space situated intermediate said screen means and said separate reaction product discharge means to collect said hydrocarbon product fluid stream before said stream is passed to said separate reaction product discharge means for withdrawal of reaction product without accompaniment and substantially free of broken or irregular shaped catalyst particles.

2. The apparatus of claim 1 wherein said apparatus is possessed with a separate integral solid particle supply means for supply of integral solid particles to said unitary distance between said first and said second conical surfaces and thereby resultant protection of said screen means by said juxtaposition of integral solid particles therewith.

3. The apparatus of claim 1 wherein said apparatus has said screen means arranged in an upper part of said separate catalyst discharge means.

4. The apparatus of claim 1 wherein said apparatus has a screen means comprising a substantially annular screen means with a substantially cylindrical ring-shaped upper part and a substantially ring-shaped lower part.

* * * * *